J. W. COCHRAN.
RAILWAY CAR SPRING.

No. 92,267. Patented July 6, 1869.

Witnesses

United States Patent Office.

J. W. COCHRAN, OF NEW YORK, N. Y.

Letters Patent No. 92,267, dated July 6, 1869.

---

IMPROVED RAILWAY-CAR SPRING.

---

The Schedule referred to in these Letters Patent and making part of the same.

---

*To all whom it may concern:*

Be it known that I, J. W. COCHRAN, of the city, county, and State of New York, have invented a new and useful Improvement in Springs Applicable to Railroad or Street-Cars, and other purposes, of which the following is a full, clear, and exact description, reference being had to the accompanying drawing, forming part of this specification, and in which—

Figure 1:
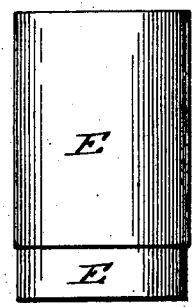
Figure 2:
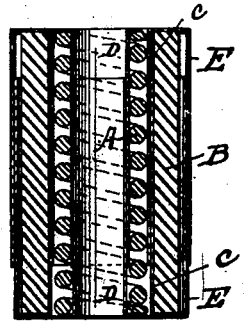
Figure 3:
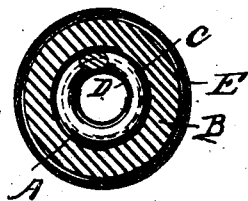

Figure 1 represents a longitudinal outside view of a spring constructed in accordance with my invention;

Figure 2, a mainly sectional view thereof, taken in direction of its length;

Figure 3, a transverse section of the same; and

Figure 4:
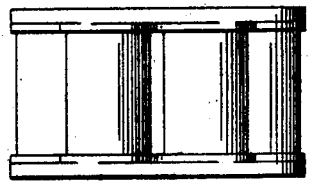
Figure 5:
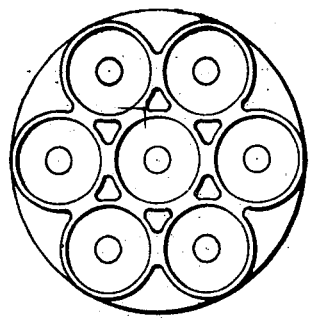

Figures 4 and 5, a side view and plan, with the one end-plate or follower removed, of a cluster of such springs arranged to act in concert.

Similar letters of reference indicate corresponding parts.

Numerous attempts have been made to combine rubber springs with metallic ones of a spiral character, for the purpose of producing a combination - spring which, while less expensive than a solid rubber spring, possesses large or increased efficiency, together with lightness and other advantages. To this end, spiral metallic springs have been introduced, as central cores, to rubber springs of an annular character, and have also been let into cavities made in the body of the rubber surrounding the central opening, and, in some cases, the spiral springs filled with a core of hard-pressed wool; also, the rubber, on its exterior, bound by metallic springs of a divided hoop or clasp-form; but most of these constructions or combinations either fail to secure the springs from doubling or bending, or else are too rigid, or expose the rubber to being cut and burst by the spiral metal springs within them, and are otherwise objectionable.

My invention consists in a certain combination or combinations of telescopic tubes, or sections of tubes, arranged to form walls or supports to a central spiral spring, and surrounding rubber one, of annular form, whereby, while the combination-spring thus produced is of a hollow or tubular character, the springs are restrained from doubling, or being bent out of axial line, and are stiffened and supported, yet free to act independently, and in concert, without contact of the spiral spring and rubber, or danger of the former cutting or bursting the latter, and a powerful yet easy-operating spring is produced.

Referring, in the first instance, to figs. 1, 2, and 3, of the drawing—

A represents a spiral steel spring, arranged centrally within and throughout the length of the eye of an annular rubber spring, B, but not so as to form a close fit within the same.

Surrounding the spiral spring A, in a free or loose manner, both as regards it and the rubber spring B, within which they lie, are telescopic sleeves or tubes, C C, arranged to extend the length of the combined spring, and connected with the same at its ends, so as to close, one within the other, when the springs are compressed, and to draw out with the latter, when expanded.

Similar telescopic sleeves, D D, may be arranged, for like operation, within the spiral spring A.

These several telescopic sleeves, which may be made of thin sheet-iron, are in noways designed to operate as springs; but, to make them available as walls or supports to the springs A and B, and to provide for expansion and contraction of said springs in a transverse direction, accordingly as they are compressed or allowed to relax, said sleeves C C and D D are divided in direction of their length, and, preferably, made to overlap where divided; or, more than one such division may be made, as shown in fig. 3, so that the telescopic sleeves thus made up in sections by longitudinal divisions of them, constitute staves, as it were, to support the springs A and B, without objectionably restricting the transverse expansion or contraction of said springs, which they not only stiffen, while securing freedom of action, but keep apart, and prevent from rubbing against or cutting, the one into the other, and whereby any lateral pressure of the springs is spread, in a uniform manner, over an extended surface, without any possibility of the springs doubling or bending under pressure applied to them, and a comparatively frictionless and easy action secured to them.

A combination-spring thus made is, at once, both powerful, strong, and durable.

Surrounding the rubber spring B, on its outside, may be a further telescopic tube or case, E E, connected, by overlapping flanges, or otherwise, at its ends, with the rubber, but, preferably, not divided longitudinally, and being of such internal diameter as to leave a sufficient space between it and the rubber, to relieve the latter of lateral friction or contact with it, excepting when the closing-pressure is being applied to the spring, when such outer sleeve or case serves to gradually stiffen the whole spring, and, on extreme pressure being applied, to bind or hold the rubber, as it were, at its set, and to restrain the spiral spring from "shutting" or bumping, whereby injury to or breakage of the springs is avoided.

Combination-springs constructed as described, may either be used singly, or, as represented in figs. 4 and 5, in clusters, by arranging them, at their ends, on or around pin-like projections entering their central cavities, and within recesses made in suitable end-plates, the one of which may be a fixed head-plate, and the other a follower, or both followers, according to the purpose the spring is designed to be applied to.

What is here claimed, and desired to be secured by Letters Patent, is—

1. The combination, with a metallic spiral spring, and surrounding rubber one, of a telescopic tube or sleeves, arranged to surround the spiral spring, and within the eye of the rubber spring, substantially as specified.

2. The combination, with a metallic spiral spring, and surrounding rubber one, of a telescopic tube or sleeves, arranged to support the spiral spring on its interior, essentially as herein set forth.

3. The combination of inside and outside telescopic tubes or sleeves to a metallic spiral spring, with an outside or surrounding rubber spring, substantially as specified.

4. The combination, with an inner metallic spiral spring, and surrounding rubber one, of a telescopic tube or case, arranged to freely surround, on its outside, or enclose the rubber spring, substantially as described.

J. W. COCHRAN.

Witnesses:
   FRED. HAYNES,
   J. W. COOMBS.